Oct. 5, 1926.                                                       1,601,955
                          J. R. GAMMETER
            METHOD AND APPARATUS FOR VULCANIZING TIRES
                   Filed Feb. 6, 1924        2 Sheets-Sheet 1
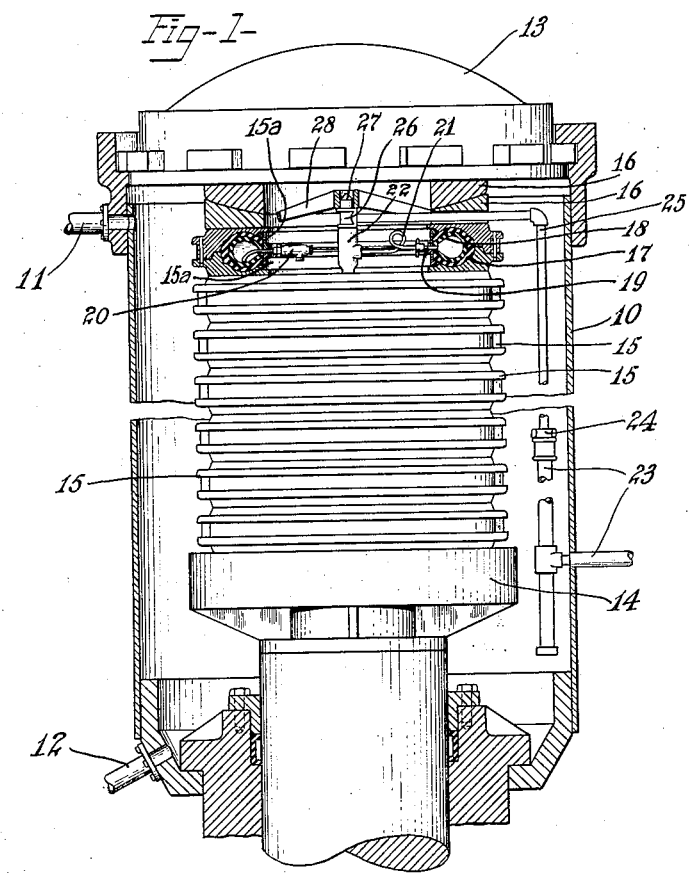
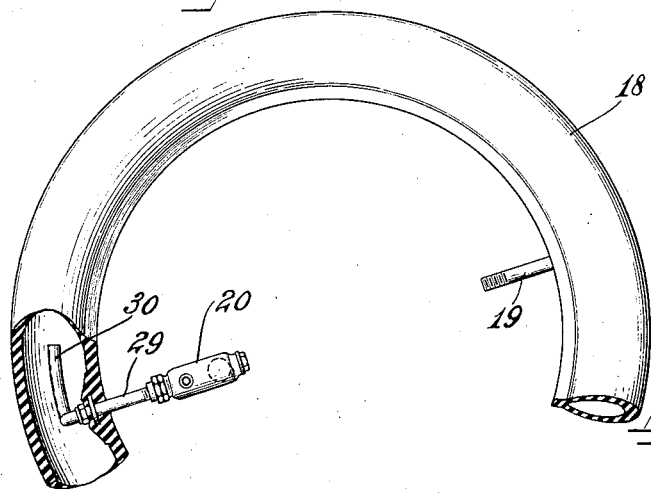
Inventor-
John R. Gammeter
By Robert McPierson
            Atty- Oct. 5, 1926.
J. R. GAMMETER
1,601,955
METHOD AND APPARATUS FOR VULCANIZING TIRES
Filed Feb. 6, 1924        2 Sheets-Sheet 2
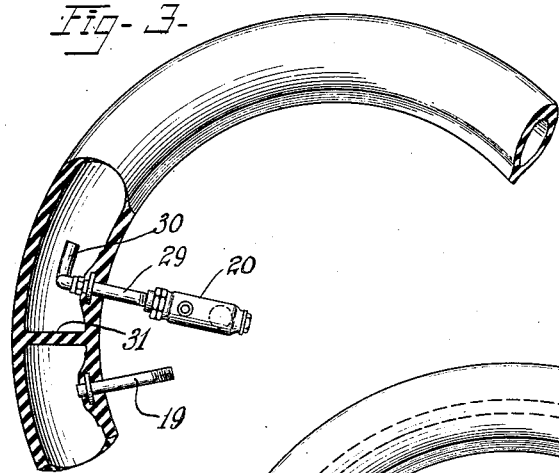
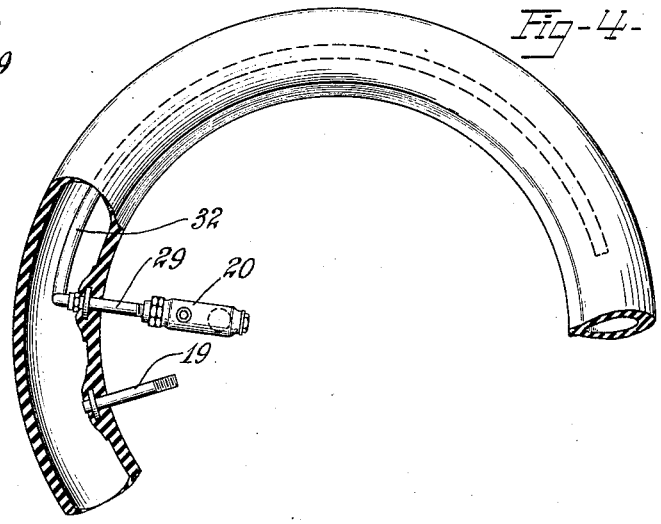
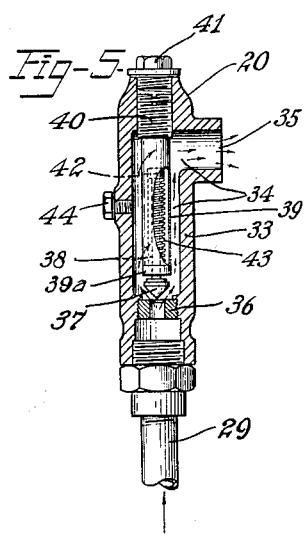
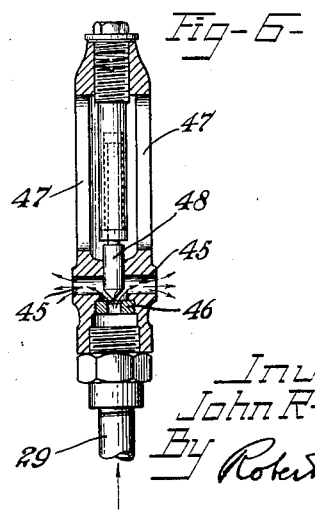
Inventor
John R. Gammeter
By Robert M. Pierson
Atty.

Patented Oct. 5, 1926.

1,601,955

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR VULCANIZING TIRES.

Application filed February 6, 1924. Serial No. 690,963.

This invention relates to the art of vulcanizing rubber articles and is of especial value in vulcanizing hollow rubber articles such as pneumatic tire casings, where a heating or distending fluid is conducted into the article or into a hollow core upon which the article is vulcanized.

In procedure heretofore employed, a tire, for example, has been expanded against the mold in which it is vulcanized by forcing a pressure fluid into an expansible core within the tire, and in order to soften the rubber of the tire before expanding it and also to rid the core of air, steam has first been injected into the core at less than expanding pressure, condensing to water at a temperature above the normal boiling point, and after the tire has thus been heated to a softening temperature the core has been vented through its inlet tube, the condensed water thereupon flashing back into steam, mixing with the air, and the mixture of air and steam escaping from the core. Steam or water at high pressure and temperature has then been forced into the core, distending the latter to expand the tire against the mold and to vulcanize it in its expanded condition.

In such procedure, however, some time has been required for the initial warming of the tire and condensation of steam at a temperature above the normal boiling point, and the venting of the core through the inlet tube has also delayed the operation. While the initial charge of steam is being condensed, different parts of the core cavity are occupied by steam, air and water of condensation, respectively, with the result that for an appreciable time the inner surface of the tire is not heated at the same rate throughout.

My invention is an improvement upon the procedure just described, my chief object being to secure an improved product, to shorten the vulcanizing operation, and more particularly to provide a method and apparatus whereby a hollow rubber article, such as a tire, may be quickly and uniformly heated from the interior, either to a vulcanizing temperature or, initially, only to a temperature such as to soften the rubber and permit the article to be readily and uniformly expanded against the mold in which it is vulcanized. Further objects are to avoid rapid deterioration of the expansible core upon which the article may be vulcanized, and to insure uniformity of temperature in successive vulcanizing operations.

In brief my invention provides apparatus and procedure whereby the air initially contained within the hollow article or vulcanizing core may be quickly eliminated by circulating a fluid, preferably steam, therethrough, the steam being admitted at one point and at the same time vented at a different point, in a manner such that the fluid will be required to flow throughout substantially the entire space which is to be rid of air. Thus the air may be disposed of before the expansible core, for example, has been subjected to a prolonged heating, so that the destructive oxidizing effect of the air upon the core may be minimized. A temperature controlled relief valve is connected to the vent of the space within the article and is set to close automatically at a determinate temperature, which is reached after the air has been expelled, the closing of the valve permitting the article to be further heated and expanded by the continued injection of the heating and expanding fluid thereinto.

Of the accompanying drawings:

Fig. 1 is a vertical section of vulcanizing apparatus embodying and adapted to carry out my invention in a preferred form, as applied to the vulcanization of tires.

Fig. 2 is a fragmentary plan view, partly in section, of an expansible core constituting a part of said apparatus.

Fig. 3 is a similar view of a modified form of core.

Fig. 4 is a similar view of another modification of the core.

Fig. 5 is a longitudinal section of a temperature controlled relief valve used on the core.

Fig. 6 is a longitudinal section of a modified form of relief valve.

Referring to the drawings, 10 designates generally a heated-press of known construction, having the usual steam and drain connections 11 and 12, interlocking cover 13 and ram 14, the latter being adapted to support a stack of tire molds 15, 15, and press the same against the lower one of a pair of annular, pressure equalizer members 16, 16, the upper one of which abuts the heater-press cover. The uppermost mold of the stack, in Fig. 1, is shown in section, with a tire 17 and an expansible vulcanizing core 18 therein, the core being provided with a fluid inlet tube 19 and a temperature controlled relief valve 20 opposite thereto, said inlet tube 19 having connection through a flexible pipe 21 with a sectional manifold or header, the uppermost section of which is shown at 22, various types of sectional manifolds suitable for this purpose being well known in the art. The tire mold 15, of the type here shown, is provided with a pair of bead clamping rings 15ª, 15ª, the latter being formed with suitable grooves to accommodate the inlet tube 19 and the tube upon which the relief valve 20 is mounted.

For supplying a heating or pressure fluid to said manifold, a pipe structure 23 leads into the vulcanizer through a side wall thereof, and connected to said pipe structure by a telescope joint 24 is a pipe structure 25 extending upward beside the stack of molds and horizontally over the uppermost mold to the center of the stack, the lowermost equalizer member 16 being grooved to accommodate it. 26 is a plug and socket coupling member connecting said pipe structure 25 with the uppermost section 22 of the manifold, and said coupling member is formed with a tapered portion 27 projecting upward and receiving the apertured hub of a spider 28 mounted upon the lower equalizer member 16, for positioning the stack of manifold sections 22, this arrangement being such that the equalizer members 16 may be lifted from the vulcanizer and the pipe structure 25 raised and turned aside to permit the removal of the molds in succession from the stack and the mounting of another set of molds on the ram.

The vulcanizing core, 18, referring first to Figs. 1 and 2, is of the expansible type, being composed chiefly of rubber, although I do not wholly limit my claims to an expansible core, and the temperature controlled relief valve 20, positioned diametrically opposite the inlet tube 19, is mounted upon a metal tube 29 traversing and anchored in the wall of the core and having a short extension 30 within the core opening adjacent the floor of the latter, so that water of condensation will be driven out through the relief valve in advance of steam or air. The mouth of said extension 30 being substantially opposite the inlet tube 19, the arrangement is such that fluid conducted into the core through the latter will flow circumferentially of the core in both directions from said tube.

In the modified form of core shown in Fig. 3, the inlet tube 19 and the temperature controlled relief valve 20 are mounted closely adjacent each other, but the mouth of the short extension 30 is separated from said inlet tube by a fluid tight partition 31 in the core cavity, this construction being such as to cause fluid conducted into the core through the inlet tube 19 to flow throughout substantially the entire circumferential length of the core, but in one direction only, to the relief valve.

In the modified core of Fig. 4, the inlet tube 19 and relief valve 20 are positioned close to each other, as in Fig. 3, but the partition 31 of Fig. 3 is omitted and the pipe 29 is provided, within the core, with a long, flexible extension 32, which may be either of metal or other suitable material, said extension reaching to a part of the core substantially opposite the inlet tube 19, so as to provide substantially the same effect as to the flow of fluid, as is obtained in the construction of Fig. 2.

The relief valve 20 of Figs. 1 to 5, shown in detail in Fig. 5, is of a type heretofore known, adapted to close in response to the temperature of the fluid passing therethrough, and comprises an outer barrel member 33 connected to the pipe 29 and formed with an L-shaped fluid passage 34 therethrough, leading from said pipe to a laterally directed dischage orifice 35. Mounted in said passage adjacent the pipe 29 is a valve seat 36 and adapted to seat thereon is a conical valve head 37 having a stem 38 extending, with a sliding fit, through the end-closure member 39ª of a "cartridge" or casing 39, the latter being supported in the passage 34 by a head 40 on the casing, said head being screwed into a bore in the end of the barrel member 33 and backed by a closure plug 41 screwed into said bore.

The end of the valve stem 38 within the casing 39 is secured to an end-closure member 42 of a corrugated metal tube 43 surrounding said stem and having its other end abutting and preferably sealed to the inner face of the end-closure member 39ª of the casing 39. The space between said casing and the corrugated tube 43 being filled with oil or other suitable heat-expansible liquid, the valve head 37 is adapted to be forced against its seat 36 by expansion of said fluid, against the force of the corrugated tube 43, the latter acting as a spring as well as a fluid retaining wall, and the closure member 42 of the corrugated tube acting somewhat in the manner of a piston, as will be readily understood. 44 is a closure plug for an observation opening in the wall of the barrel member 33, said opening being adapted to facilitate the accurate setting of the cartridge to close the valve at a desired temperature.

The modified relief valve shown in Fig. 6 is of similar construction and operation except that it is adapted to close in response to the temperature of the medium surrounding it instead of that of the vented fluid, said fluid being vented through apertures 45, 45 leading from the valve seat 46 directly to the exterior of the outer barrel member. The latter is cut away about the cartridge, as as 47, 47, to permit access of the surrounding medium to the cartridge, and is formed with a floor traversed by a guide aperture in which the valve head, 48, of modified form, is slidably mounted, so that the escaping fluid may not flow directly from the valve seat to the cartridge.

In the preferred operation of the apparatus, the temperature controlled relief valves are set to close at a temperature somewhat below that at which the tires are to be vulcanized, and, the tires being mounted in the apparatus as shown in Fig. 1, steam is first let into the cores 18 through the inlet tubes 19 at a line pressure of about 100 lbs., for example, the steam flowing rapidly through the cores and escaping through the temperature controlled relief valves into the heater chamber, thus driving the air and water of condensation from the cores. The heater chamber may be vented if desired, although I do not exclude the idea of building up a steam pressure in said chamber, during or before this part of the operation, by flow of steam through the cores or otherwise, such as will not prevent the desired rapid flow of steam through the cores for a time sufficient to expel substantially all of the air therefrom.

The relief valves having been previously set, as above stated, to close at a determinate temperature, such as 287° F., for example, corresponding to a steam pressure of about 40 lbs., the core will have been so heated in a short time, approximating that required for the expulsion of the air, as to permit steam to pass the valves at such temperature as to close the latter, whereupon the pressure within the cores will quickly build up to the 100 lbs. pressure of the steam line, without excessive accumulation of water of condensation in the cores.

Preferably such steam pressure is then maintained within the cores for a time sufficient to further heat and soften the tires, the corresponding temperature being about 338°. Such preliminary internal heating of the tires is preferably continued for about 20 minutes, during which time a steam pressure of about 52 lbs., with a temperature of about 300° F., is maintained in the heater chamber. The steam supply is then shut off from the cores and water from a line having a temperature of about 300° F., and a pressure of about 300 lbs., which is substantially greater than the corresponding steam pressure, is let into the cores, condensing the steam therein and expanding the tires against their molds. These conditions are then maintained for a time sufficient to complete the vulcanization of the tires.

As a modification of the procedure described, steam may be initially let into the cores at a temperature and pressure such as to cure, or to expand and cure, the tires, the steam expanding and cooling within the cores so as to permit the relief valves to remain open for a time; or water at a pressure greater than the steam pressure corresponding to its temperature may be initially let into the cores, the water which first enters the cores flashing into steam and driving the air therefrom. In the procedure last suggested, of course the extent to which the several advantages of my invention will be obtained will depend upon the position, in the conduit leading to the cores, at which the water is permitted to expand as steam, and upon the rate at which it is permitted to flow past such position.

My invention provides for the quick heating of the tires from the interior as well as through the molds, so as to obtain a quick and uniform vulcanization, the heat-retarding effect of the air being quickly eliminated by the thorough expulsion of the latter. Oxidation of the interior surface of the core is avoided, quick equalization of temperature throughout the interior of the core is effected, and these several advantages are obtained with comparatively little labor and expenditure of time and care in the matter of closing and opening fluid connections. As the relief valves may be set to close very accurately at a determinate temperature, uniformity between successive cures of tires may be had. Unexpelled water of condensation within the cores is of such small amount as not greatly to cool the high pressure water which is let in for the expanding and final heating of the tires, so that a very close determination of the final vulcanizing temperature of the water is made possible, and as the air is very thoroughly expelled the core may be filled substantially full of water by condensation of the residual steam, the pocketing of residual air being avoided.

While I have described the operation more particularly as it relates to cores equipped with the relief valve of Fig. 5, the operation may be substantially the same with the relief valve of Fig. 6, except that when this type of relief valve is used the temperature schedule in the heater chamber must be so coordinated with the flow of fluid through the cores as to cause the closing of the valve at the desired time. The type of core shown in Fig. 3, although requiring the fluid to flow through a longer path in passing through the core cavity, has the advantage that the flow is equal at substantially all positions circumferentially of the core, whereas in the cores of Figs. 2 and 4 a greater flow of steam in one direction than in the other, from the inlet tube 19, may take place. It will be understood, however, that my invention is not wholly limited to the use of a core as the means for confining the fluid in the space within the hollow article.

Various modifications in addition to those above described may be resorted to without departing from the scope of my invention, and I do not wholly limit my claims to the specific forms thereof shown and described.

I claim:

1. The method of vulcanizing a hollow rubber article which comprises expelling air therefrom by passing an innocuous fluid therethrough, said fluid being so injected and vented at different points as to be compelled to flow substantially throughout the space within the article, stopping the escape of said fluid when a determinate temperature condition is attained, and vulcanizing the article without permitting re-entry of air thereinto.

2. The method of vulcanizing a hollow rubber article which comprises expelling air therefrom by passing therethrough a heated fluid, said fluid being so injected and vented at different points as to be compelled to flow substantially throughout the space within the article, then stopping the escape of said fluid when a determinate temperature condition is attained, and vulcanizing the article while confining the residual fluid therein.

3. The method of vulcanizing a hollow rubber article which comprises expelling air therefrom by passing steam therethrough from a point of ingress to a point of egress operatively remote therefrom, then stopping the escape of said steam and vulcanizing the article while confining the residual fluid therein.

4. The method of vulcanizing a hollow rubber article which comprises passing a heated fluid therethrough, then stopping the escape of said fluid when a determinate temperature condition is attained and vulcanizing the article while confining the residual fluid therein.

5. The method of vulcanizing a hollow rubber article which comprises expelling air therefrom by passing steam therethrough from a point of ingress to a different point of egress as to expel substantially all air and water of condensation from said article, then stopping the escape of said steam and vulcanizing the article while holding it expanded against a mold by additional fluid forced thereinto.

6. The method of vulcanizing a hollow rubber article, which comprises passing steam therethrough from a point of ingress to a different point of egress, then stopping the escape of said steam, condensing the residual steam in said article by the force of water thereon at a vulcanizing temperature and under a pressure greater than the corresponding steam pressure, thereby expanding said article against a mold, and vulcanizing it while it is so expanded.

7. The method of vulcanizing a hollow rubber article, which comprises passing steam therethrough from a point of ingress to a point of egress operatively remote therefrom, then stopping the escape of said steam when the temperature of the escaping steam has reached a determinate value, and vulcanizing the article while confining the residual fluid therein.

8. The method of vulcanizing a rubber article against a hollow mold member which comprises expelling air from said member by passing therethrough a heated fluid, said fluid being injected and vented at such points as to be compelled to flow substantially throughout the space within said member, stopping the escape of said fluid when a determinate temperature condition is attained, and then vulcanizing the article while preventing reentry of air into said member.

9. The method of vulcanizing a rubber article against a hollow, expansible mold member which comprises so passing a heated fluid therethrough from a point of ingress to a different point of egress as to compel said fluid to flow substantially throughout the space within said member, then stopping the escape of said fluid and vulcanizing the article while holding said member expanded by confining the residual fluid under pressure therein.

10. The method of vulcanizing a rubber article against a hollow, expansible mold member which comprises so passing a heated fluid therethrough from a point of ingress to a different point of egress as to compel said fluid to flow substantially throughout the space within said member, then stopping the escape of said fluid when a determinate temperature condition is attained and vulcanizing the article while holding said member expanded by confining the residual fluid under pressure therein.

11. The method of vulcanizing a hollow rubber article on a hollow, expansible core which comprises so passing steam therethrough from a point of ingress to a different point of egress as to compel said steam to flow throughout the space within said core, then stopping the escape of said steam and condensing the residual steam in said article by the force of water thereon at a temperature and under a pressure greater than the corresponding steam pressure, thereby expanding the core and article, and vulcanizing the article while it is so expanded.

12. The method of vulcanizing a hollow rubber article on a hollow, expansible core which comprises so passing steam therethrough from a point of ingress to a different point of egress as to compel said steam to flow throughout the space within said core, then stopping the escape of said steam when a determinate temperature condition is attained and condensing the residual steam in said article by the force of water thereon at a temperature and under a pressure greater than the corresponding steam pressure, thereby expanding the core and article, and vulcanizing the article while it is so expanded.

13. Apparatus for vulcanizing a hollow rubber article, said apparatus comprising means for conducting a heating fluid into the space within the article, and temperature-controlled confining and venting means adapted to permit said fluid to escape from said space until a determinate temperature condition is reached and then to prevent such escape.

14. Vulcanizing apparatus comprising a hollow molding member having a fluid inlet and a fluid outlet, a normally-open valve disposed in said outlet, and a temperature responsive device for closing said valve.

15. Vulcanizing apparatus comprising a hollow, expansible molding member having a fluid inlet and a fluid outlet, said outlet being operatively remote from said inlet, a normally-open valve disposed in said outlet, and means responsive to the temperature of the fluid passing through said outlet for closing the said valve.

16. Vulcanizing apparatus comprising a hollow, expansible molding member having a fluid inlet and a fluid outlet, said outlet being operatively remote from said inlet, a temperature-controlled valve on said outlet, and a tube extending from said outlet into said member and opening adjacent the floor thereof.

17. Apparatus for vulcanizing tire casings, said apparatus comprising means defining an annular space within the tire casing, means for circulating a heated fluid therethrough to sweep out the air confined in said space, and temperature-responsive means for shutting off the said circulation of the heated fluid when the air has been substantially removed from the said space.

18. Apparatus for vulcanizing tire casings, said apparatus comprising means defining an annular space within the tire casing, means for circulating steam therethrough to sweep out the air confined in said space, and automatic means responsive to the temperature of the fluids being ejected from said space to shut off the circulation of steam upon said ejected fluids reaching a predetermined temperature.

19. Apparatus for vulcanizing tires, said apparatus comprising an expansible tire core having a cavity therein in the form of a partial annulus, an inlet adjacent one extremity of said cavity, an outlet adjacent the other extremity thereof, a normally-open valve disposed in said outlet, and means responsive to the temperature of fluid passing through said outlet for closing said valve.

In witness whereof I have hereunto set my hand this 23rd day of January, 1924.

JOHN R. GAMMETER.